United States Patent
Park et al.

(10) Patent No.: US 12,407,042 B2
(45) Date of Patent: Sep. 2, 2025

(54) BATTERY MODULE AND BATTERY PACK INCLUDING THE SAME

(71) Applicant: LG Energy Solution, Ltd., Seoul (KR)

(72) Inventors: Won Kyoung Park, Daejeon (KR); Junyeob Seong, Daejeon (KR); Myungki Park, Daejeon (KR); Subin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/909,748

(22) Filed: Oct. 8, 2024

(65) Prior Publication Data

US 2025/0038304 A1    Jan. 30, 2025

Related U.S. Application Data

(63) Continuation of application No. 18/030,477, filed as application No. PCT/KR2022/002995 on Mar. 3, 2022.

(30) Foreign Application Priority Data

Mar. 22, 2021  (KR) .................. 10-2021-0036923

(51) Int. Cl.
*H01M 10/6568*  (2014.01)
*H01M 10/613*  (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC .......... H01M 10/6568; H01M 10/613; H01M 10/6554; H01M 50/204
See application file for complete search history.

(56) References Cited

U.S. PATENT DOCUMENTS

| | | | |
|---|---|---|---|
| 2011/0293974 A1 | 12/2011 | Yoon et al. | |
| 2013/0143081 A1* | 6/2013 | Watanabe | ........... H01M 50/204 |
| | | | 429/71 |

(Continued)

FOREIGN PATENT DOCUMENTS

| | | |
|---|---|---|
| CN | 109119552 A | 1/2019 |
| CN | 209843767 U | 12/2019 |

(Continued)

*Primary Examiner* — Jonathan G Jelsma
(74) *Attorney, Agent, or Firm* — Bryan Cave Leighton Paisner LLP

(57) ABSTRACT

A battery module including an upper battery cell stack and a lower battery, each of the upper and lower battery cell stacks including a plurality of battery cells; a cooling flow path located between the upper battery cell stack and the lower battery cell stack; a housing for the upper battery cell stack and the lower battery cell stack; an inlet port for supplying a refrigerant to the cooling flow path; and an outlet port for discharging the refrigerant from the cooling flow path, where the inlet and outlet ports are located opposite to each other, so that the refrigerant flows in one direction in the cooling flow path. A longitudinal direction of each of the plurality of battery cells is parallel to the one direction of flow of the refrigerant.

15 Claims, 14 Drawing Sheets

(51) Int. Cl.
  *H01M 10/625*  (2014.01)
  *H01M 10/6554*  (2014.01)
  *H01M 50/204*  (2021.01)

(52) U.S. Cl.
  CPC ..... *H01M 10/6554* (2015.04); *H01M 50/204* (2021.01); *H01M 2220/20* (2013.01)

(56) References Cited

U.S. PATENT DOCUMENTS

| | | | |
|---|---|---|---|
| 2016/0372805 A1 | 12/2016 | Kim et al. | |
| 2018/0241021 A1 | 8/2018 | Kim et al. | |
| 2020/0076026 A1 | 3/2020 | Ohkuma | |
| 2020/0127255 A1* | 4/2020 | Moon | H01M 10/6568 |
| 2020/0194751 A1 | 6/2020 | Fujii et al. | |
| 2020/0251698 A1 | 8/2020 | Paramasivam et al. | |
| 2021/0066769 A1 | 3/2021 | Hong et al. | |

FOREIGN PATENT DOCUMENTS

| | | | |
|---|---|---|---|
| CN | 111769221 A | 10/2020 | |
| DE | 102020102182 A1 | 8/2020 | |
| EP | 3 984 865 A1 | 4/2022 | |
| JP | 2016201303 A | 12/2016 | |
| JP | 2020-35710 A | 3/2020 | |
| JP | 2020-98698 A | 6/2020 | |
| KR | 10-2015-0100365 A | 9/2015 | |
| KR | 10-1847182 B1 | 4/2018 | |
| KR | 10-2019-0133434 A | 12/2019 | |
| KR | 10-2072220 B1 | 1/2020 | |
| KR | 10-2020-0133289 A | 11/2020 | |
| KR | 10-2021-0017172 A | 2/2021 | |
| KR | 10-2021-0017274 A | 2/2021 | |
| WO | WO-2021074575 A1 * | 4/2021 | ......... H01M 50/204 |

* cited by examiner

[FIG. 1]
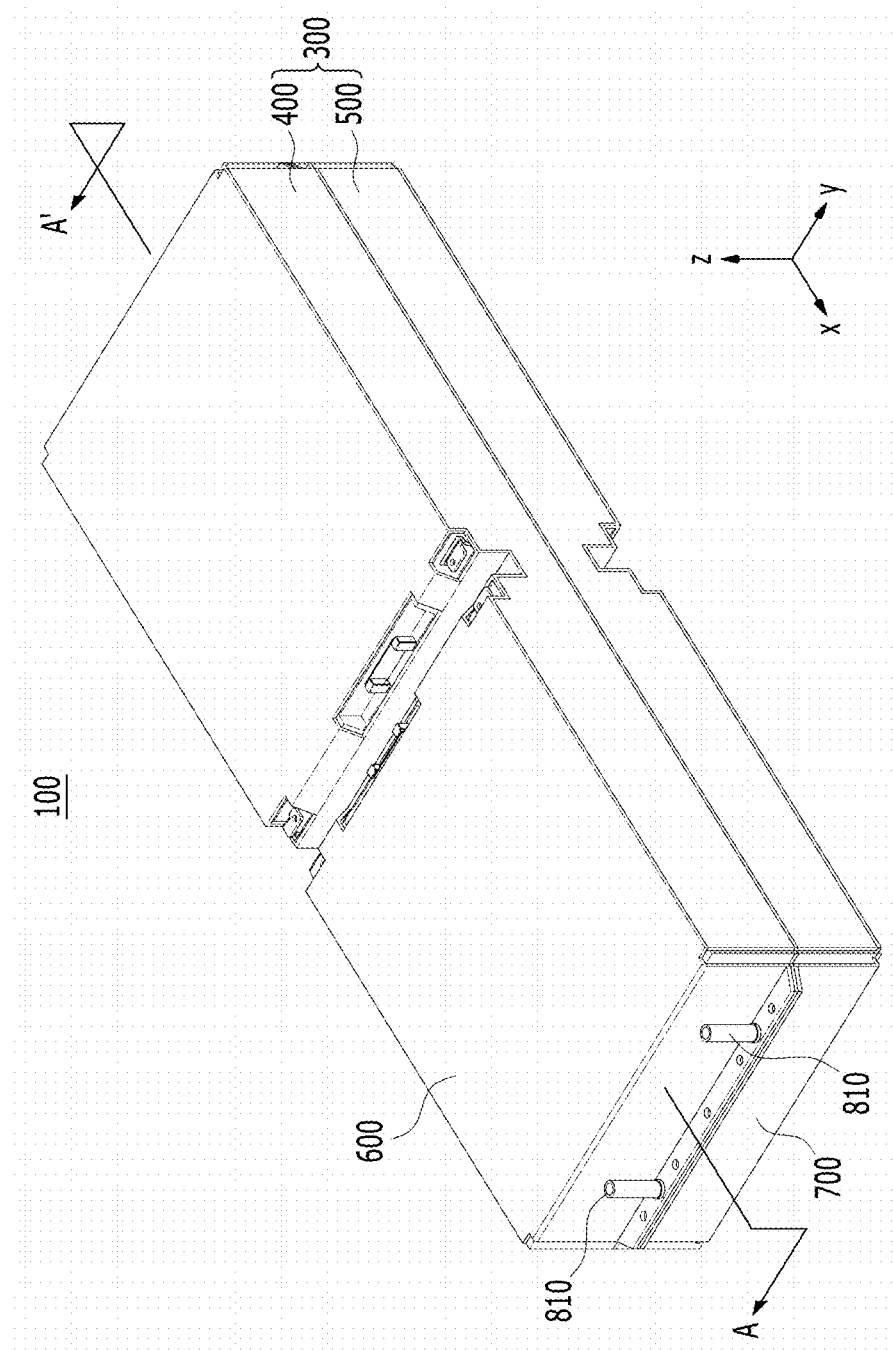

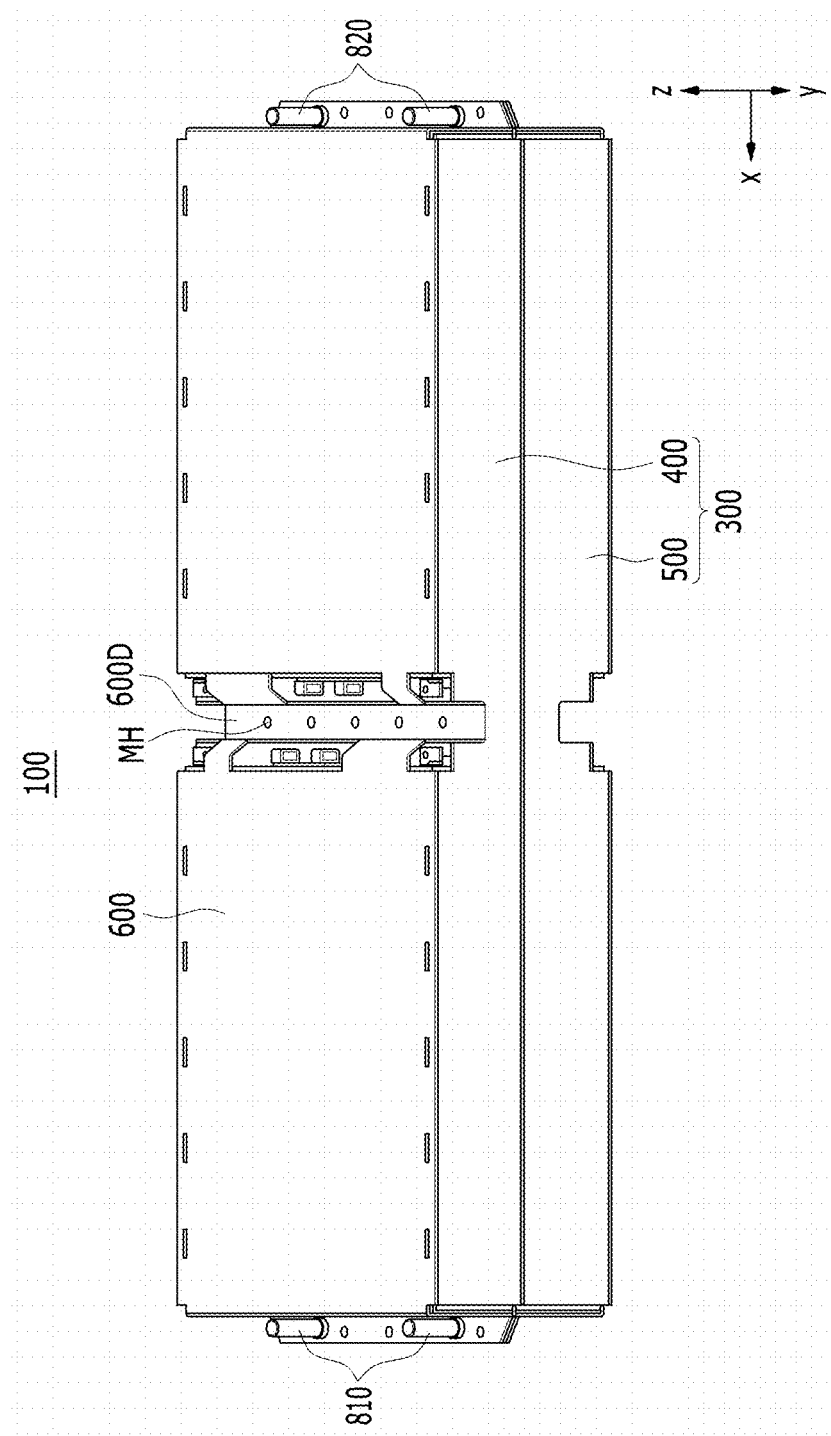
[FIG. 2]

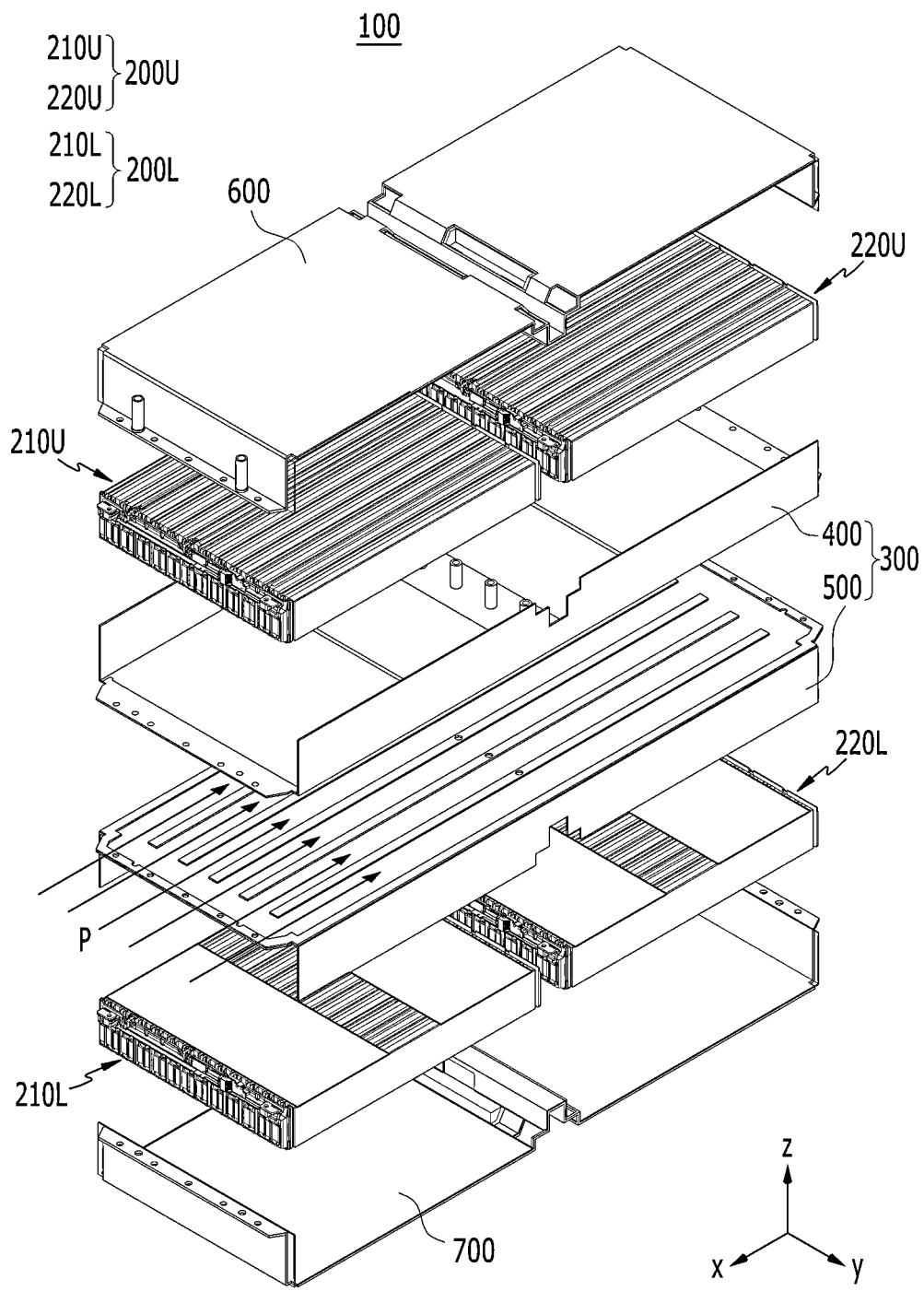
[FIG. 3]

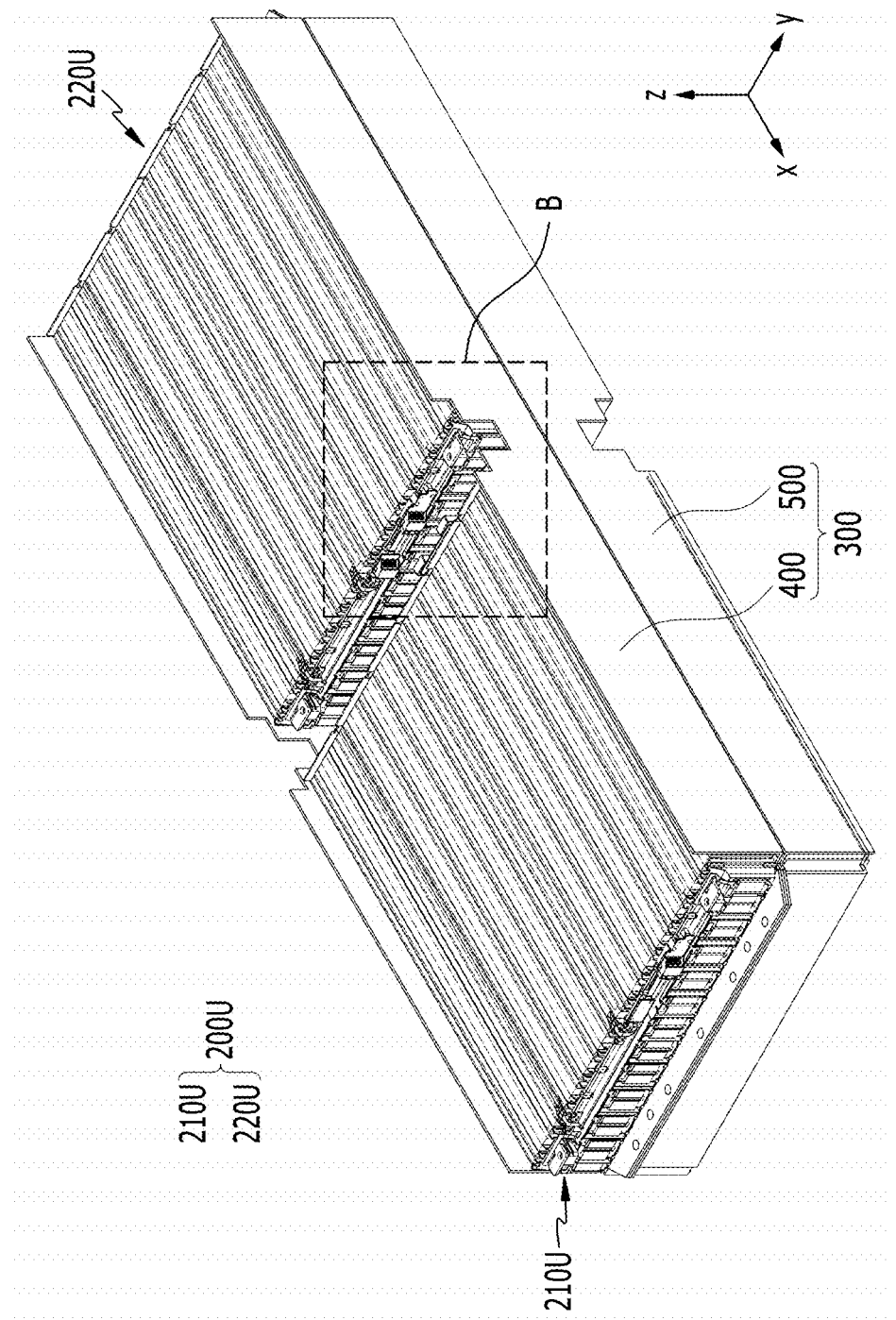
[FIG. 4]

[FIG. 5]
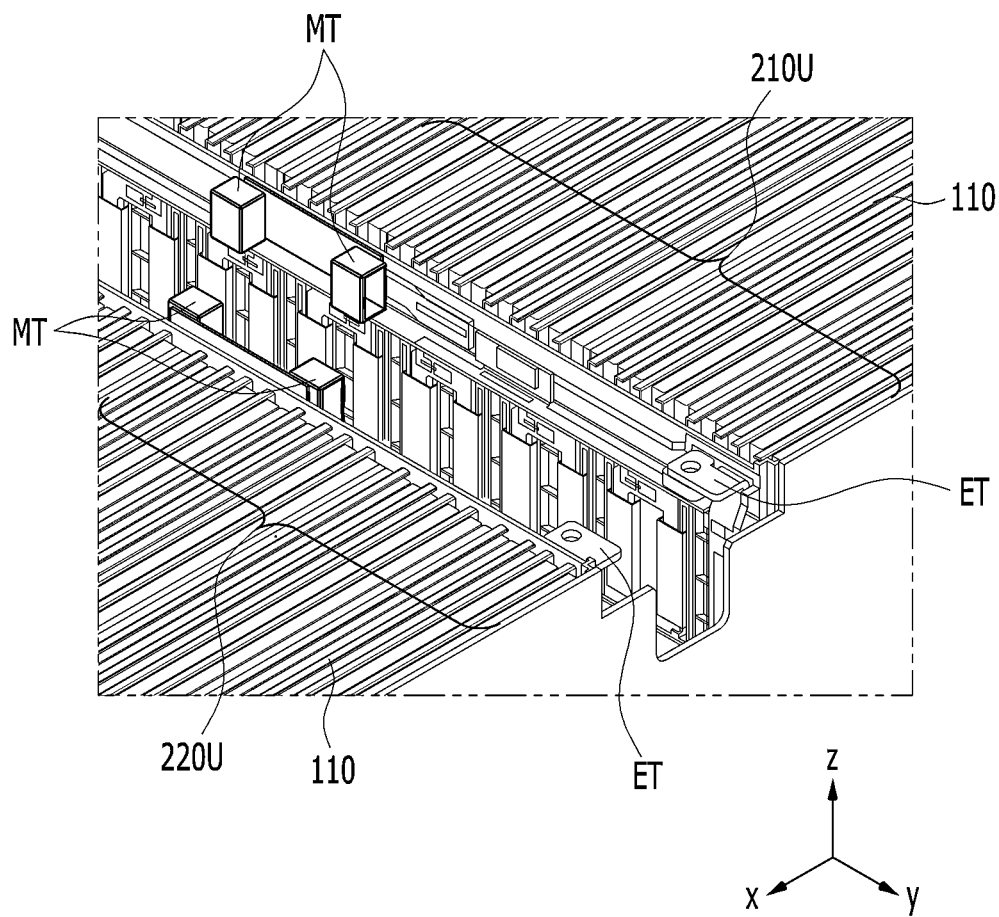

[FIG. 6]
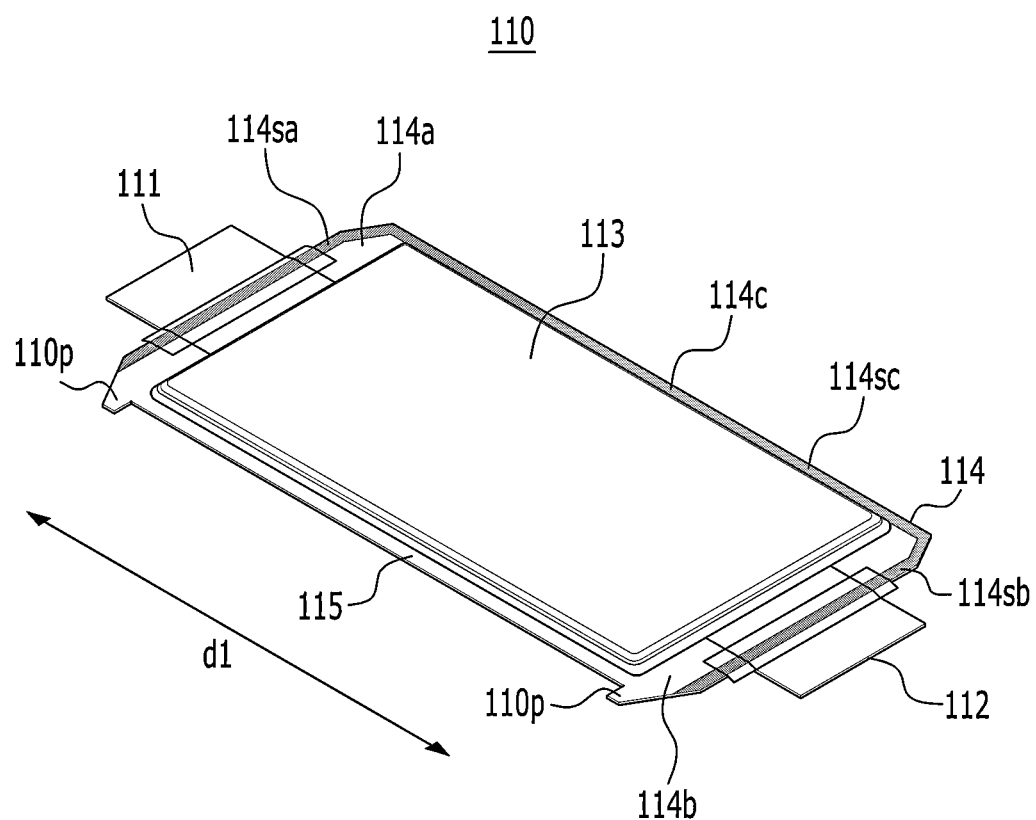

[FIG. 7]
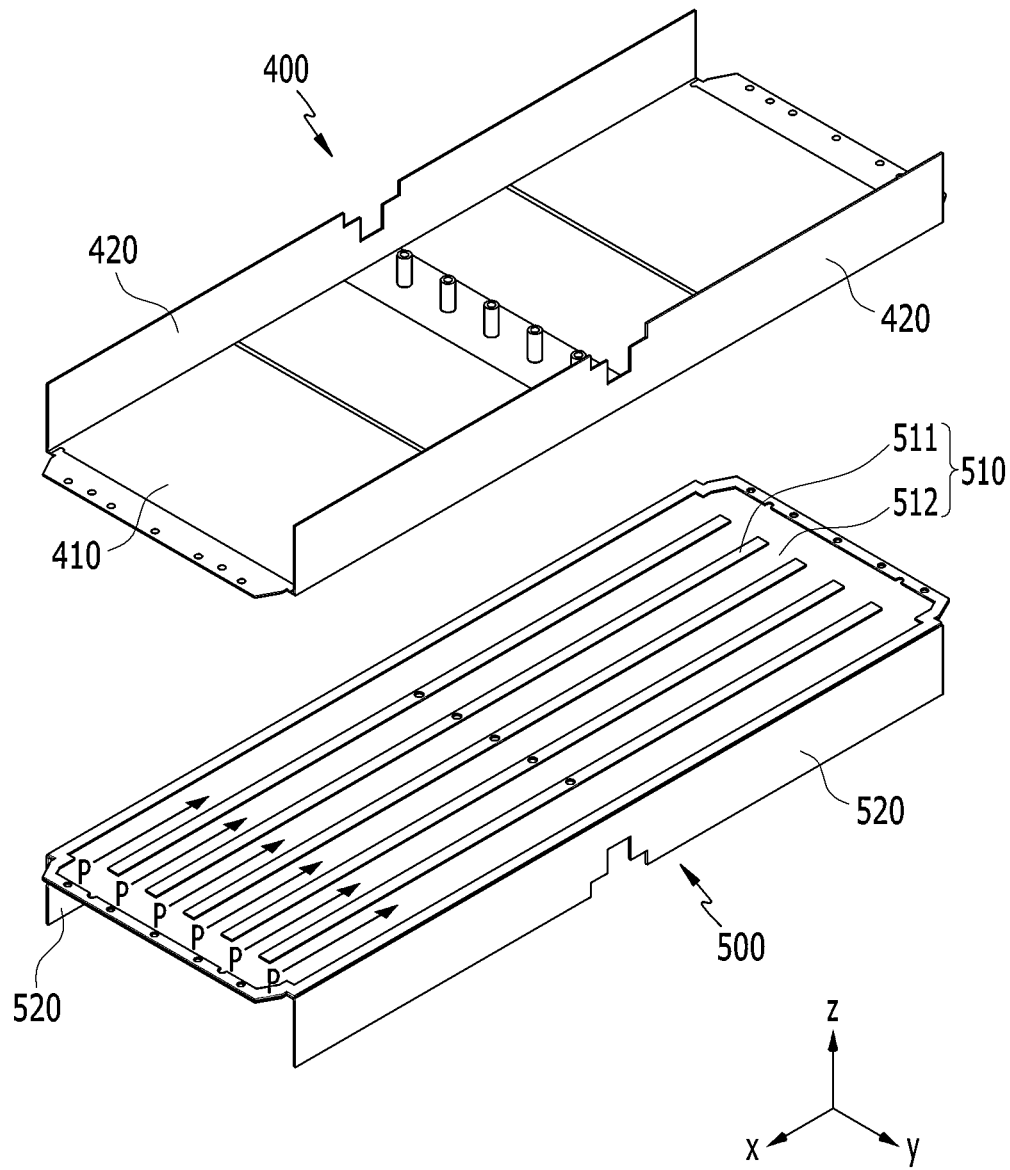

[FIG. 8]
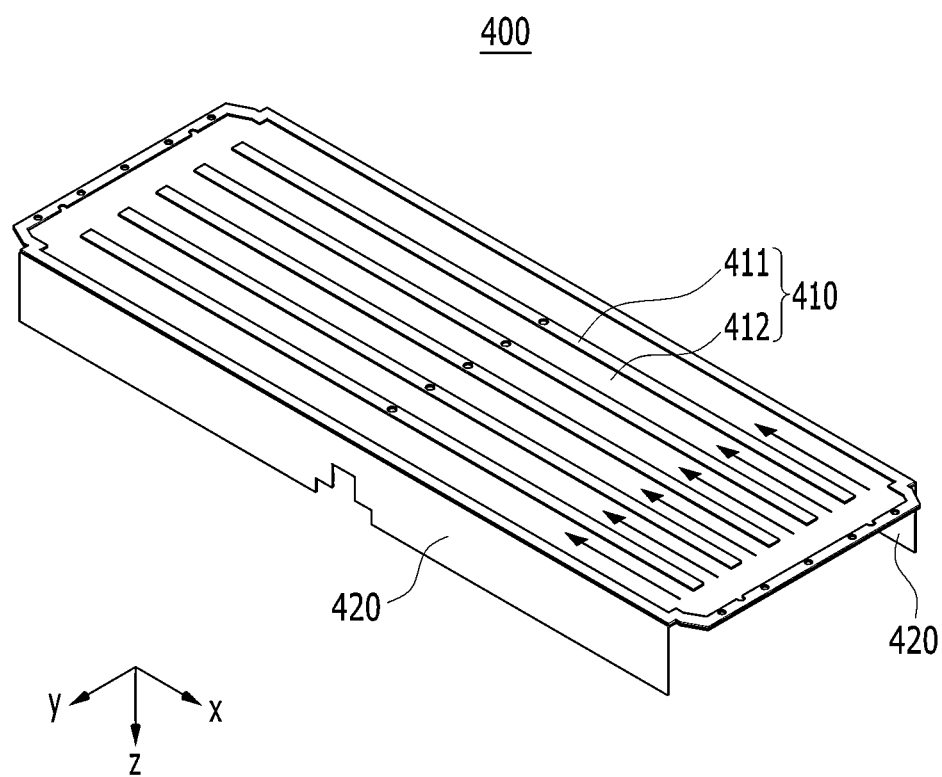

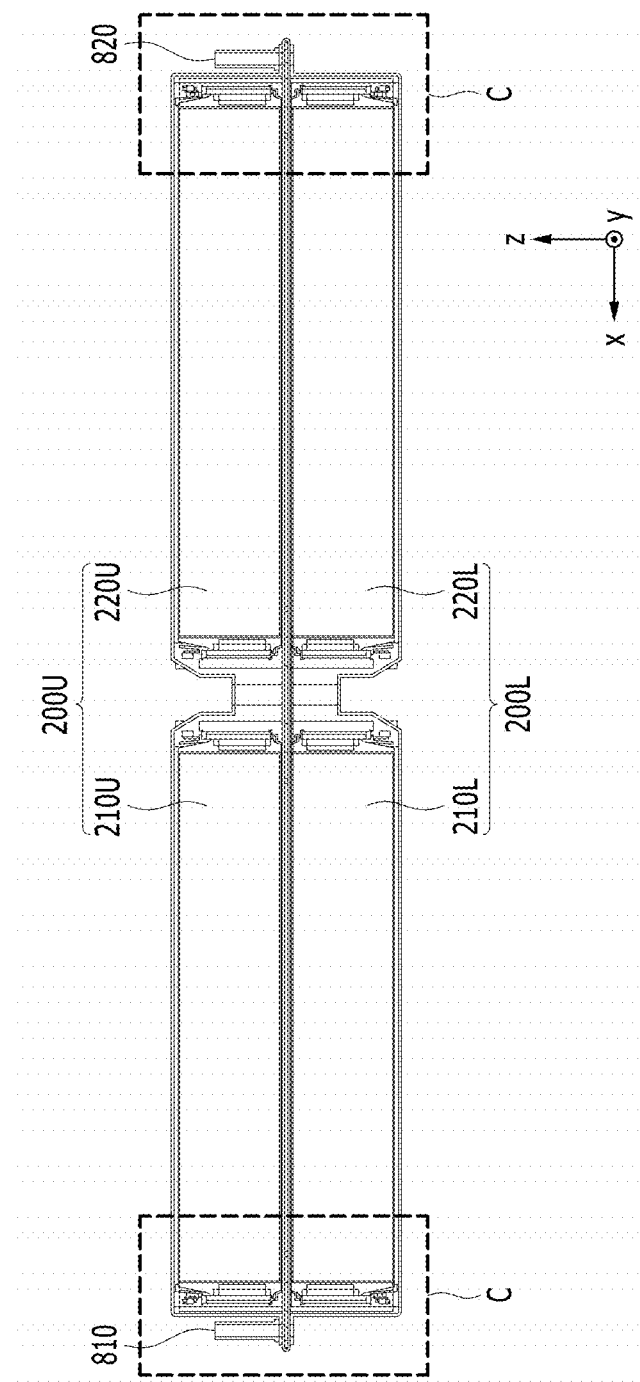
[FIG.9]

[FIG. 10]
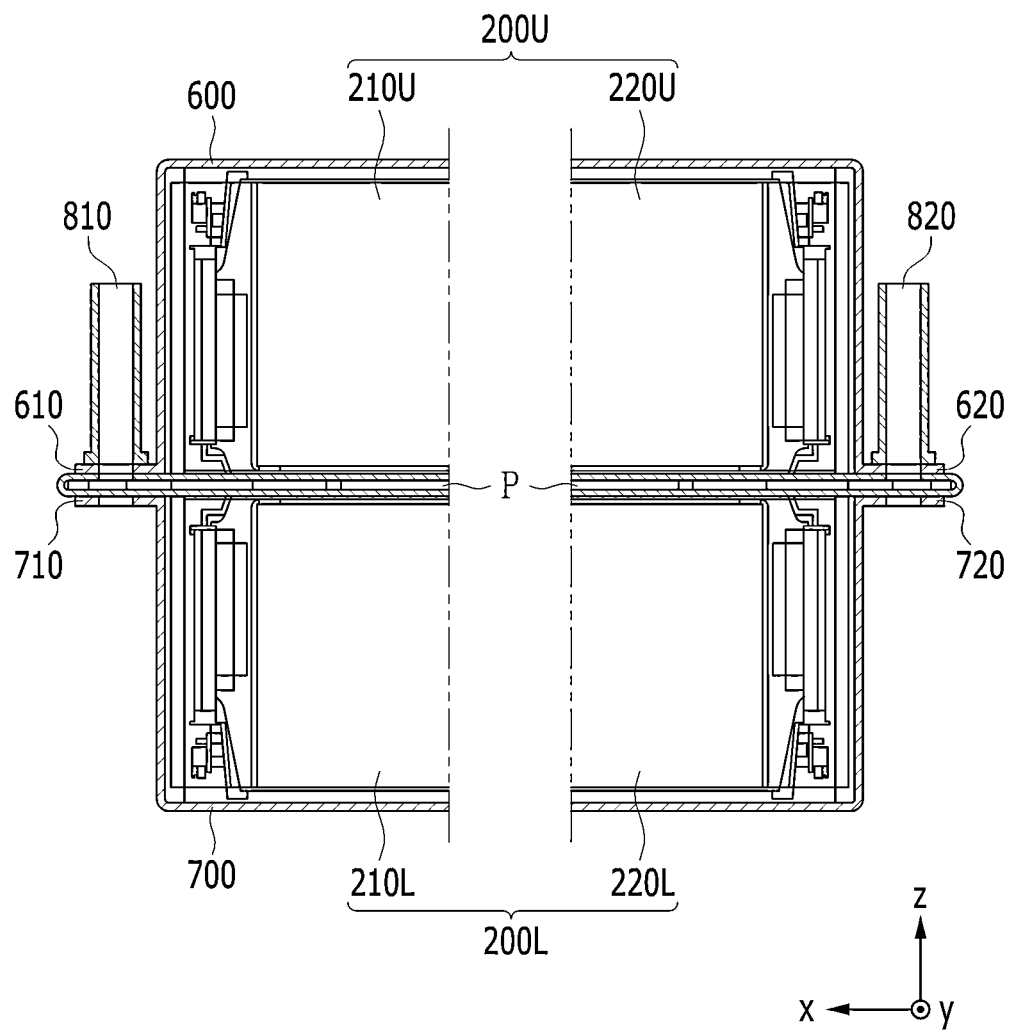

[FIG. 11]
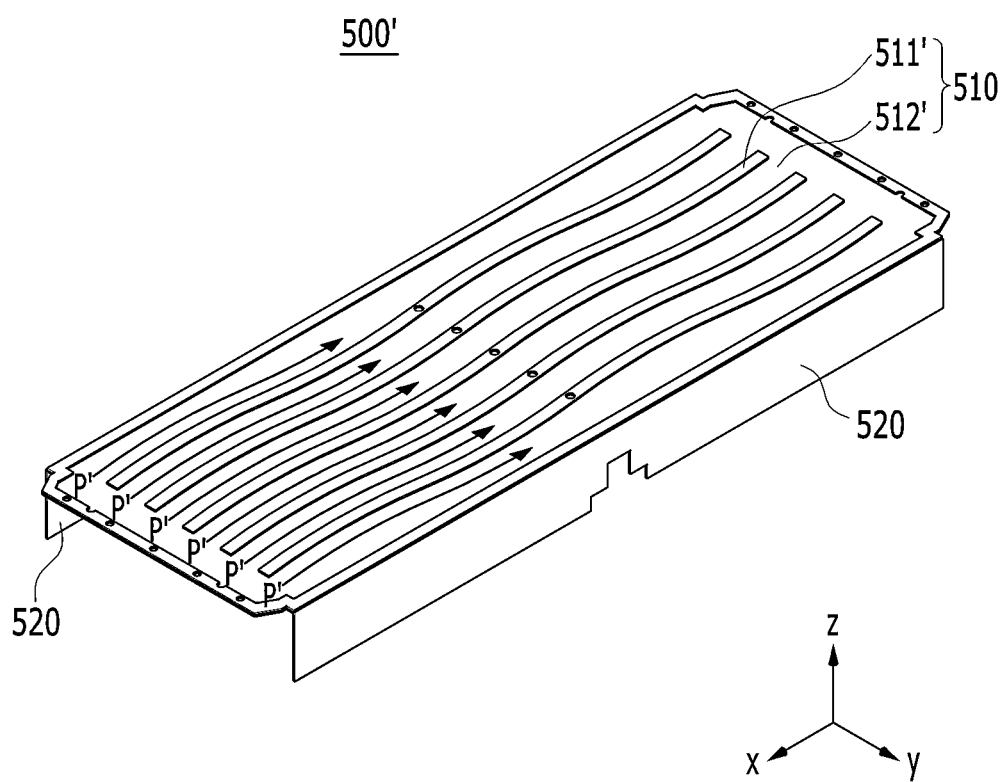

[FIG. 12]
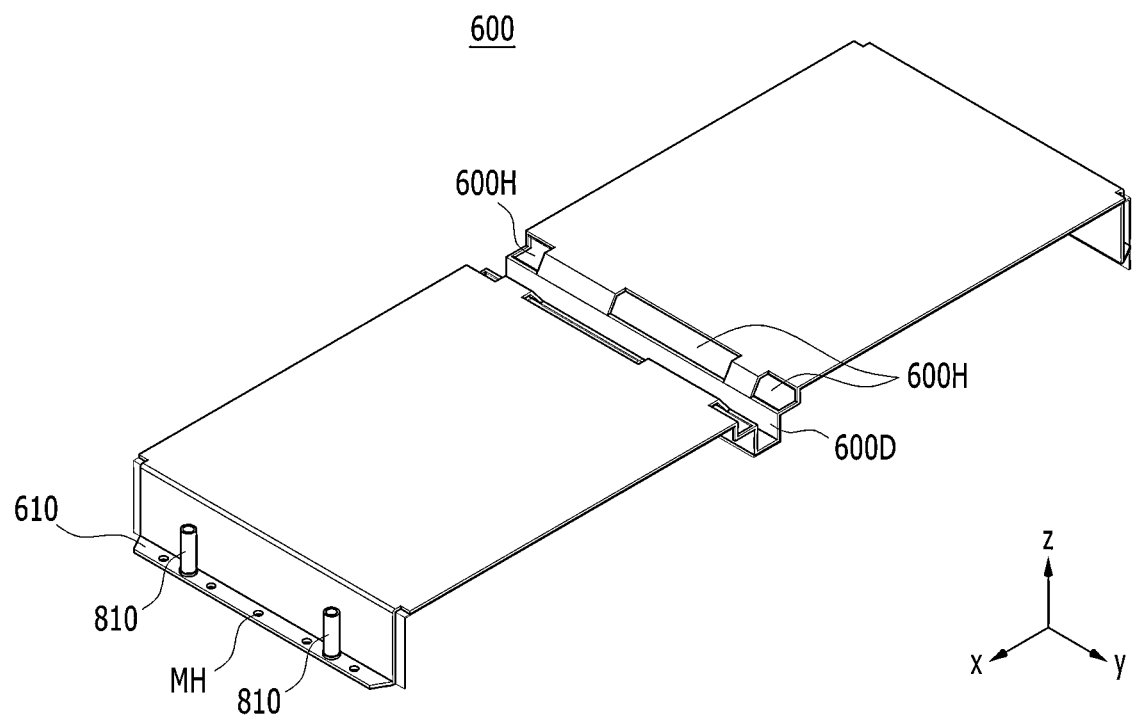

[FIG. 13]
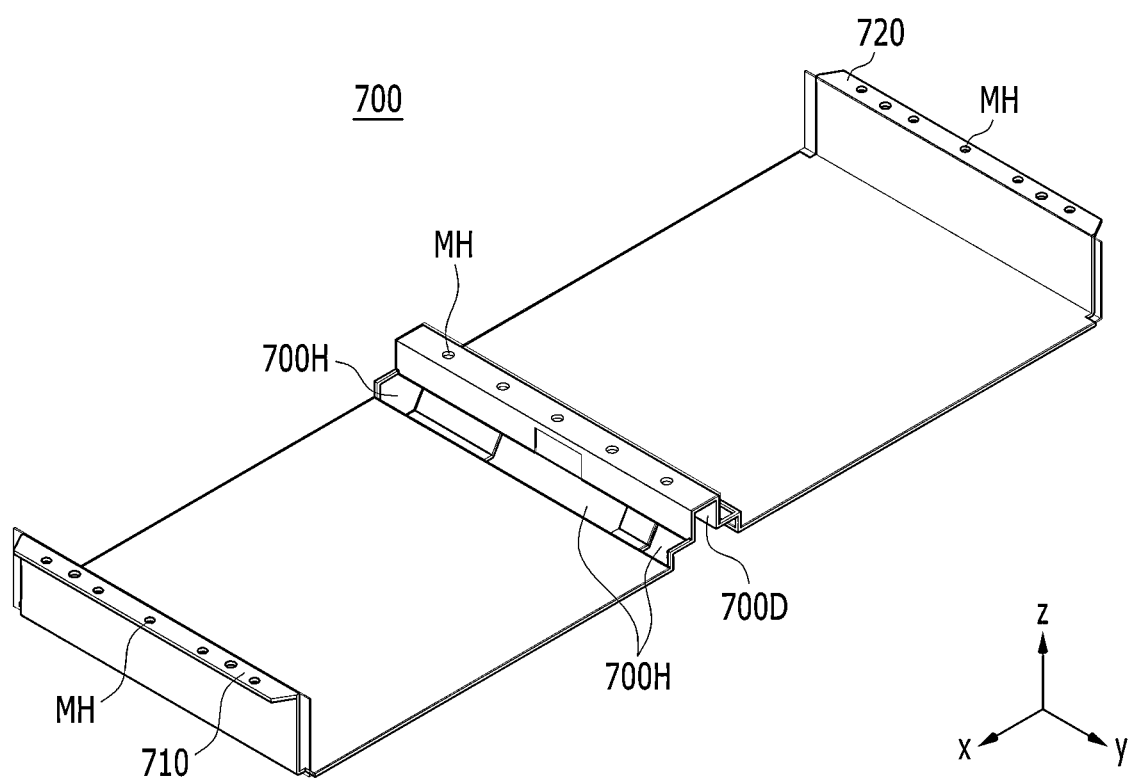

[FIG. 14]
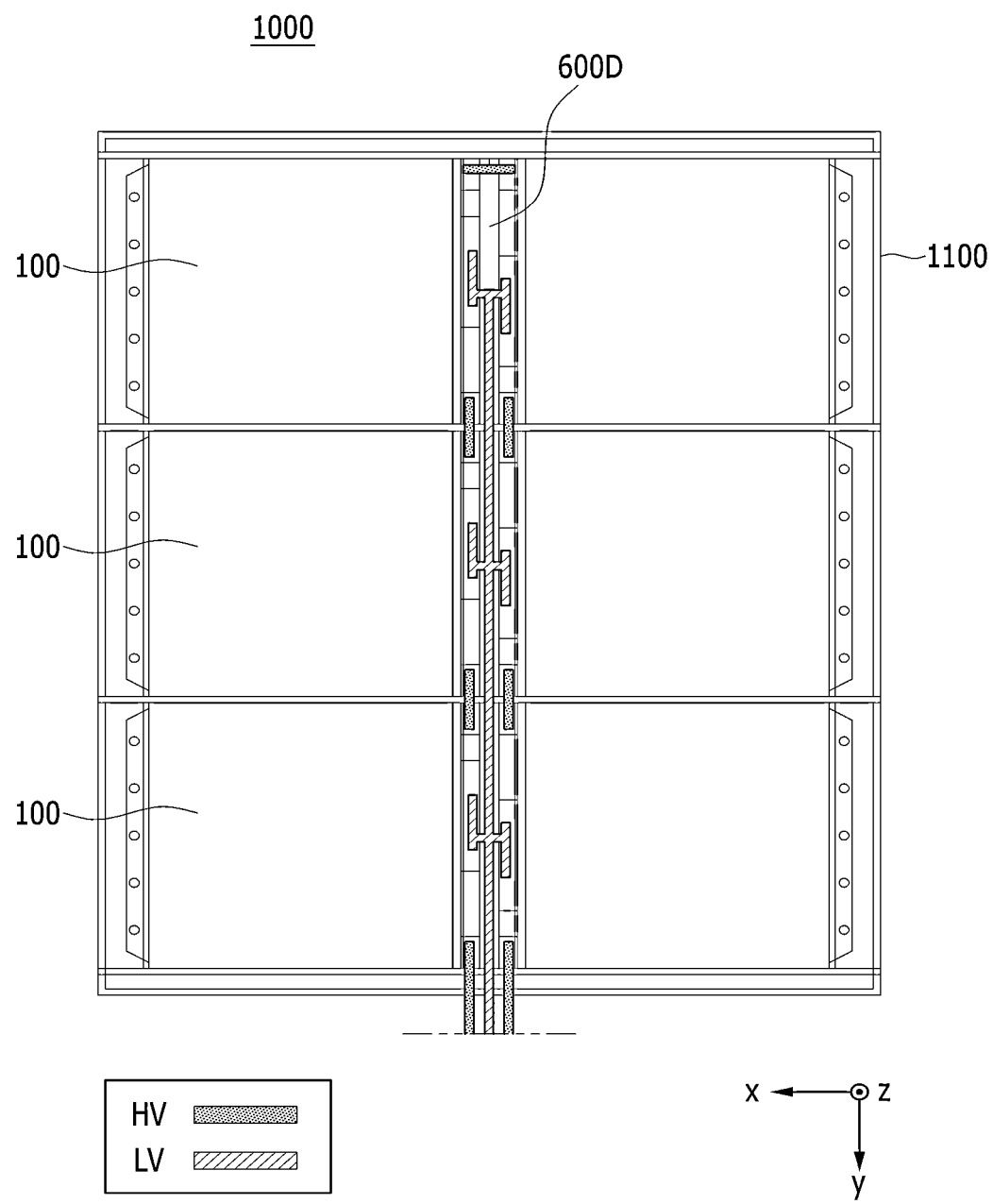

BATTERY MODULE AND BATTERY PACK INCLUDING THE SAME

CROSS-REFERENCE TO RELATED APPLICATIONS

This application is a continuation of U.S. patent application Ser. No. 18/030,477, filed Apr. 5, 2022, which is a U.S. national phase of international application No. PCT/KR2022/002995 filed Mar. 3, 2022, and claims the benefit of Korean Patent Application No. 10-2021-0036923 filed Mar. 22, 2021, the entire contents of which are incorporated herein by reference.

TECHNICAL FIELD

The present disclosure relates to a battery module and a battery pack including the same, and more particularly to a battery module having improved space utilization and cooling efficiency and a battery pack including the same.

BACKGROUND

In modern society, as portable devices such as a mobile phone, a notebook computer, a camcorder and a digital camera are being used daily, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, the demand for development of the secondary battery is growing.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a cathode active material and an anode active material, respectively. The lithium secondary battery includes an electrode assembly in which a cathode plate and an anode plate, each being coated with the cathode active material and the anode active material, respectively, are arranged with a separator being interposed between them, and a battery case which seals and houses the electrode assembly together with an electrolytic solution.

Generally, the lithium secondary battery may be classified based on the shape of the exterior material into a can-type secondary battery in which the electrode assembly is mounted in a metal can, and a pouch-type secondary battery in which the electrode assembly is mounted in a pouch of an aluminum laminate sheet.

In the case of a secondary battery used for small-sized devices, two to three battery cells are arranged, but in the case of a secondary battery used for a medium- or large-sized device such as an automobile, a battery module in which a large number of battery cells are electrically connected is used. In such a battery module, a large number of battery cells are connected to each other in series or parallel to form a cell assembly, thereby improving capacity and output. One or more battery modules can be mounted together with various control and protection systems such as a BDU (battery disconnect unit), a BMS (battery management system) and a cooling system to form a battery pack.

SUMMARY

It is an objective of the present disclosure to provide a battery module having improved space utilization and cooling efficiency, and a battery pack including the same.

However, the problem to be solved by embodiments of the present disclosure is not limited to the above-described problems, and can be variously expanded within the scope of the technical idea included in the present disclosure.

A battery module according to an embodiment of the present disclosure includes an upper battery cell stack and a lower battery cell stack, each of which includes a plurality of battery cells that are stacked; a cooling flow path located between the upper battery cell stack and the lower battery cell stack; and a housing in which the upper battery cell stack and the lower battery cell stack are housed. An inlet port for supplying a refrigerant to the cooling flow path and an outlet port for discharging the refrigerant from the cooling flow path are located opposite to each other, so that the refrigerant flows in one direction in the cooling flow path. A longitudinal direction of the battery cell is in parallel with the one direction in which the refrigerant flows.

The refrigerant may flow in a straight line in the cooling flow path.

In the cooling flow path, the refrigerant may flow in a curved line along the one direction.

The housing may include an upper frame in which the upper battery cell stack is housed and a lower frame in which the lower battery cell stack is housed, and the cooling flow path may be formed between the upper frame and the lower frame.

The upper frame may include an upper plate that is located on the lower surface of the bottom part of the upper frame, and an upper recessed part that is recessed upward from the upper plate. The lower frame may include a lower plate that is located on the upper surface of the top part of the lower frame, and a lower recessed part that is recessed downward from the lower plate. The upper plate and the lower plate are joined so that the upper recessed part and the lower recessed part can form the cooling flow path.

The battery module may further include an upper cover that covers the open portion of the upper frame and a lower cover that covers the open portion of the lower frame.

The upper battery cell stack may include a first upper battery cell stack and a second upper battery cell stack. The lower battery cell stack may include a first lower battery cell stack and a second lower battery cell stack.

The upper cover may include an upper recessed part that is recessed downward between the first upper battery cell stack and the second upper battery cell stack. The lower cover may include a lower recessed part that is recessed upward recessed between the first lower battery cell stack and the second lower battery cell stack.

Each of the first upper battery cell stack and the second upper battery cell stack may include an electrode terminal and a module connector exposed toward the upper recessed part. Each of the first lower battery cell stack and the second lower battery cell stack may include an electrode terminal and a module connector exposed toward the lower recessed part. A HV (high voltage) connection for connecting the electrode terminals and a LV (low voltage) connection for connecting the module connector may be formed in each of the upper recessed part and the lower recessed part.

The first upper battery cell stack and the second upper battery cell stack may be spatially separated by the upper recessed part. The first lower battery cell stack and the second lower battery cell stack may be spatially separated by the lower recessed part.

A mounting hole for mount coupling may be formed in each of the upper recessed part and the lower recessed part. The mounting hole of the upper recessed part and the mounting hole of the lower recessed part may be located so as to correspond to each other.

The upper cover may include a first upper protrusion part located on a first side and a second upper protrusion part located on a second side opposite to the first side. The inlet port may be located in the first upper protrusion part, and the outlet port may be located in the second upper protrusion part.

The lower cover may include a first lower protrusion part located to correspond to the first upper protrusion part, and a second lower protrusion part located to correspond to the second upper protrusion part.

A mounting hole for mount coupling may be formed in each of the first upper protrusion part and the first lower protrusion part. A mounting hole for mount coupling may be formed in each of the second upper protrusion part and the second lower protrusion part.

According to an embodiment of the present disclosure, the battery cell stack is arranged in a two-stage structure and the cooling flow path is arranged in between, thereby being capable of improving space utilization and cooling efficiency. In addition, the cooling flow is configured to flow in one direction, thereby being capable of reducing the pressure drop of the refrigerant.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a battery module according to an embodiment of the present disclosure;
FIG. 2 is another view of the battery module of FIG. 1;
FIG. 3 is an exploded perspective view of the battery module of FIG. 1;
FIG. 4 is a perspective view of the battery module of FIG. 3 with the upper cover removed therefrom;
FIG. 5 is a partial enlarged view of section "B" of FIG. 4;
FIG. 6 is an illustration of a battery cell included in the battery module of FIG. 3;
FIG. 7 is a perspective view of the battery module of FIG. 3 with an upper frame and a lower frame included therein;
FIG. 8 is a reverse view of the upper frame of FIG. 7 showing the lower surface of the bottom part;
FIG. 9 is a cross-sectional view along line A-A' of FIG. 1;
FIG. 10 is a partial enlarged view of area "C" of FIG. 9;
FIG. 11 is a perspective view of a lower frame according to a modified embodiment of the present disclosure;
FIG. 12 is a perspective view showing an upper cover included in the battery module of FIG. 3;
FIG. 13 is a perspective view showing a lower cover included in the battery module of FIG. 3; and
FIG. 14 is a plan view of a battery pack according to an embodiment of the present disclosure.

DETAILED DESCRIPTION

Hereinafter, various embodiments of the present disclosure will be described in detail with reference to the accompanying drawings so that those skilled in the art can easily carry out the embodiments. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 1 is a perspective view of a battery module according to an embodiment of the present disclosure. FIG. 2 is another view of of the battery module of FIG. 1. FIG. 3 is an exploded perspective view of the battery module of FIG. 1. FIG. 4 is a perspective view of the battery module of FIG. 3 with the upper cover removed therefrom.

Referring to FIGS. 1 to 4, a battery module 100 according to one embodiment of the present disclosure includes an upper battery cell stack 200U and a lower battery cell stack 200L, each of which includes a stack of a plurality of battery cells; a cooling flow path P located between the upper battery cell stack 200U and the lower battery cell stack 200L; and a housing 300 in which the upper battery cell stack 200U and the lower battery cell stack 200L are housed. The cooling flow path P refers to a passage through which the refrigerant moves. The refrigerant is a medium for cooling, and may be cooling water as an example.

The upper battery cell stack 200U and the lower battery cell stack 200L can be respectively formed by stacking a plurality of battery cells in one direction. The battery cell will be described in detail later with reference to FIGS. 5 and 6.

The housing 300 according to the present embodiment may include an upper frame 400 in which the upper battery cell stack 200U is housed, and a lower frame 500 in which the lower battery cell stack 200L is housed. A cooling flow path P may be formed between the upper frame 400 and the lower frame 500.

FIG. 5 is a partial enlarged view a section "B" of FIG. 4. FIG. 6 is an illustration of a battery cell included in the battery module of FIG. 3.

Referring to FIGS. 3, 5 and 6, a plurality of battery cells 110 according to the present embodiment may be stacked to form an upper battery cell stack 200U and a lower battery cell stack 200L, respectively. The upper battery cell stack 200U is located above the lower battery cell stack 200L.

Further, the upper battery cell stack 200U may include a first upper battery cell stack 210U and a second upper battery cell stack 220U, and the lower battery cell stack 200L may include a first lower battery cell stack 210L and a second lower battery cell stack 220L. The plurality of battery cells 110 can be stacked to form a total of four battery cell stacks 210U, 220U, 210L and 220L. The first upper battery cell stack 210U may be located above the first lower battery cell stack 210L, and the second upper battery cell stack 220U may be located above the second lower battery cell stack 220L.

Each of the plurality of battery cells 110 is preferably a pouch-type battery cell, and can be formed in a rectangular sheet-like structure. For example, a battery cell 110 according to the present embodiment has a structure in which two electrode leads 111 and 112 face each other and protrude from one end part 114a and the other end part 114b of the cell main body 113, respectively. That is, the battery cell 110 includes electrode leads 111 and 112 that protrude in mutually opposite directions. More specifically, the electrode leads 111 and 112 are connected to an electrode assembly (not shown), and protrude from the electrode assembly (not shown) to the outside of the battery cell 110.

Meanwhile, the battery cell 110 can be produced by joining both end parts 114a and 114b of a cell case 114 and one side part 114c connecting them in a state in which an electrode assembly (not shown) is housed in a cell case 114. In other words, the battery cell 110 according to the present embodiment has a total of three sealing parts 114sa, 114sb and 114sc, wherein the sealing parts 114sa, 114sb and 114sc have a structure that is sealed by a method such as heat-sealing, and the remaining other side part may be composed of a connection part 115. The cell case 114 may be composed of a laminated sheet including a resin layer and a metal layer. Further, the connection part 115 may extend long along one edge of the battery cell 110, and a bat ear 110p may be formed at an end of the connection part 115.

A plurality of such battery cells 110 may be formed, and the plurality of battery cells 110 can be stacked to be electrically connected to each other, thereby forming an upper battery cell stack 200U and a lower battery cell stack 200L.

Particularly, as shown in FIG. 5, a plurality of battery cells 110 may be stacked along the direction parallel to the y-axis. Thereby, the electrode leads 111 and 112 may protrude in the +x-axis direction and the −x-axis direction, respectively.

The upper battery cell stack 200U and the lower battery cell stack 200L according to the present embodiment may be a large-area module in which the number of battery cells 110 is increased compared to a conventional case. Specifically, 32 to 48 battery cells 110 may be included per battery cell stack. In the case of such a large-area module, the horizontal length of the battery module becomes long. Here, the horizontal length may mean a length in the direction in which the battery cells 110 are stacked, that is, in a direction parallel to the x-axis.

Meanwhile, referring to FIG. 6 again, in the electrode leads 111 and 112 protruding in mutually opposite directions, a direction parallel to the protruding direction of the electrode leads 111 and 112 is referred to as a longitudinal direction d1 of the battery cell 110. Considering the stacking direction of the battery cells 110, the longitudinal direction of the battery cells 110 in FIGS. 3 to 5 is a direction parallel to the x-axis.

Next, the cooling flow path and the housing according to the present embodiment will be described in detail with reference to FIGS. 7 to 10.

FIG. 7 is a perspective view of an upper frame and a lower frame included in the battery module of FIG. 3. FIG. 8 is a reverse view of the upper frame of FIG. 7 showing the lower surface of the bottom part. FIG. 9 is a cross-sectional view along line A-A' of FIG. 1. FIG. 10 is a partial enlarged view of section "C" of FIG. 9.

Referring to FIGS. 3 and 7 to 10, the housing 300 according to the present embodiment may include an upper frame 400 and a lower frame 500, wherein a cooling flow path P may be formed between the upper frame 400 and the lower frame 500. The inlet port 810 for supplying the refrigerant to the cooling flow path P and the outlet port 820 for discharging the refrigerant from the cooling flow path P are located opposite to each other, so that the refrigerant flows in one direction in the cooling flow path P. In addition, the longitudinal direction d1 of each of the plurality of battery cells 110 is in parallel with the one direction in which the refrigerant flows. More specifically, the refrigerant may flow in a straight line in the cooling flow path P. As shown in FIG. 7, the refrigerant may flow in a straight line in a direction parallel to the x-axis in the cooling flow path P.

The upper frame 400 according to the present embodiment may include a bottom part 410 on which the upper battery cell stack 200U is placed and a pair of side surface parts 420 extending upward from opposite sides of the bottom part 410. The bottom part 410 and the pair of side surface parts 420 may cover the lower surface and both side surfaces of the upper battery cell stack 200U, respectively.

The lower frame 500 according to the present embodiment may include a top part 510 located above the lower battery cell stack 200L and a pair of side surface parts 520 extending downward from opposite sides of the top part 510. The upper surface and both side surfaces of the lower battery cell stack 200L may be covered by the top part 510 and the pair of side surface parts 520, respectively.

Referring to FIGS. 7 and 8, the upper frame 400 may include an upper plate 411 that is located on the lower surface of the bottom part 410 of the upper frame 400 and an upper recessed part 412 that is recessed upward from the upper plate 411. As described above, FIG. 8 is a state in which the upper frame 400 is reversed so that the lower surface of the bottom part 410 can be seen, wherein the upper plate 411 protrudes in the −z-axis direction, and the upper recessed part 412 is structured to be relatively recessed in the z-axis direction. The method of forming the upper plate 411 and the upper recessed part 412 is not particularly limited. For example, a partial region of the plate-shaped member can be recessed upward to form the upper plate 411 and the upper recessed part 412. As another example, the protruding member can be joined to the lower surface of the plate-shaped member to form the upper plate 411 and the upper recessed part 412.

The lower frame 500 may include a lower plate 511 that is located on the upper surface of the top part 510 of the lower frame 500 and a lower recessed part 512 that is recessed downward from the lower plate 511. As shown in FIG. 7, the lower plate 511 protrudes in the +z-axis direction, and the lower recessed part 512 protrudes in the −z-axis direction. The method of forming the lower plate 511 and the lower recessed part 512 is not particularly limited. For example, a partial region of the plate-shaped member can be recessed downward to form the lower plate 511 and the lower recessed part 512. As another example, the protruding member can be joined to the upper surface of the plate-shaped member to form the lower plate 511 and the lower recessed part 512.

When the bottom part 410 of the upper frame 400 is placed on the top part 510 of the lower frame 500, the upper plate 411 and the lower plate 511 can be joined, and the upper recessed part 412 and the lower recessed part 512 corresponding to each other can form the cooling flow path P.

The upper plate 411 and the lower plate 511 may extend in parallel with the longitudinal direction d1 of the battery cell 110. Thereby, the refrigerant may flow in one direction through the upper recessed part 412 and the lower recessed part 512 in the cooling flow path P.

The cooling flow path P formed in the battery module 100 according to the present embodiment extends along one direction instead of the bent path. Also, it is in parallel with the longitudinal direction d1 of the battery cell 110. Uniform cooling for each of the plurality of battery cells 110 may be possible for the upper battery cell stack 200U or the lower battery cell stack 200L. Since the temperature deviation between the plurality of battery cells 110 included in the battery module 100 leads to deterioration of battery performance, it is important to eliminate the temperature deviation. Since the battery module 100 according to the present embodiment enables uniform cooling of each of the plurality of battery cells 110, a temperature deviation between respective battery cells 110 can be reduced.

Further, in accordance with the present embodiment, the straight-line cooling flow path P can reduce pressure drop in the latter half of the cooling flow path P, compared to a path having a plurality of curves. In the case of a cooling flow path having a plurality of curves, particularly, a cooling flow path in which the inlet port and the outlet port of the refrigerant are located on the same side and which essentially includes a large bent path, the pressure loss of the refrigerant is large, and thus, a large-capacity refrigerant pump is required for supplying and discharging the refrigerant. Since such a large-capacity refrigerant pump occupies a large space, the space efficiency inside a device such as an automobile is deteriorated. On the other hand, the cooling flow path P according to the present embodiment is a path that extends along one direction, and pressure drop can be greatly reduced. Thereby, equivalent heat exchange performance and cooling performance can be realized even with a smaller capacity refrigerant pump. Since a refrigerant pump having a smaller capacity can be used, there is an advantage in that the space inside a device such as an automobile can be efficiently utilized.

Meanwhile, as described above, the upper battery cell stack 200U and the lower battery cell stack 200L are stacked in two stages, and a cooling flow path P is formed therebetween. That is, the upper battery cell stack 200U and the lower battery cell stack 200L share one cooling flow path P, rather than having separate cooling flow paths. As compared to forming separate cooling paths, the number of parts required for cooling can be reduced, and as the number of parts is reduced, the assembling property of the battery module can be improved. Further, since one cooling flow path P is shared, the space utilization inside the battery module 100 can be increased.

Meanwhile, an upper thermal resin layer may be located between the upper battery cell stack 200U and the bottom part 410 of the upper frame 400. Also, a lower thermal resin layer may be located between the lower battery cell stack 200L and the top part 510 of the lower frame 500. The upper and lower thermal resin layers can be formed by applying a thermal resin having high thermal conductivity and adhesiveness and then curing the resin. In one example, the thermal resin may include at least one of a silicone material, a urethane material, or an acrylic material. Heat generated in the upper battery cell stack 200U may be transferred to the cooling flow path P through the upper thermal resin layer, and heat generated in the lower battery cell stack 200L may be transferred to the cooling flow path P through the lower thermal resin layer.

FIG. 11 is a perspective view of a lower frame according to a modified embodiment of the present disclosure.

Referring to FIG. 11, the lower frame 500' according to a modified embodiment of the present disclosure may include a top part 510 and a pair of side surface parts 520, and may include a lower plate 511' that is located on the upper surface of the top part 510 and a lower recessed part 512' that is recessed downward from the lower plate 511'. The cooling flow path P' formed by the lower plate 511' and the lower recessed part 512' may have a curved path while continuing in one direction. Although it is not bent at an angle of about 90 degrees, a curved cooling flow path P' that is bent to some degree may be formed by the lower plate 511' and the lower recessed part 512'. Thereby, the refrigerant may flow in a curved line along one direction in the cooling flow path P'. Meanwhile, although not specifically shown in the figure, the upper plate and the upper recessed part of the upper frame may also form a curved cooling flow path that corresponds to the lower plate 511' and the lower recessed part 512'.

Next, the upper cover, the lower cover, and the HV and LV connection structures according to the present embodiment will be described in detail with reference to FIGS. 12 and 13.

FIG. 12 is a perspective view of an upper cover included in the battery module of FIG. 3. FIG. 13 is a perspective view of a lower cover included in the battery module of FIG. 3.

Referring to FIGS. 3, 5, 12 and 13, the battery module 100 according to the present embodiment may further include an upper cover 600 for covering the open portion of the upper frame 400 and a lower cover 700 for covering the open portion of the lower frame 500.

The upper cover 600 may cover the front surface and the upper surface of the first upper battery cell stack 210U, and the rear surface and the upper surface of the second upper battery cell stack 220U. Here, the front surface and the upper surface of the first upper battery cell stack 210U mean a surface in the x-axis direction and a surface in the z-axis direction, respectively, of the first upper battery cell stack 210U. The rear surface and the upper surface of the second upper battery cell stack 220U mean a surface in the −x-axis direction and a surface in the z-axis direction, respectively, of the second upper battery cell stack 220U.

The upper cover 600 and the upper frame 400 are joined at their corresponding edges, so that the upper battery cell stack 200U can be housed therein.

The lower cover 700 may cover the front and lower surfaces of the first lower battery cell stack 210L, and the rear and lower surfaces of the second lower battery cell stack 220L. Here, the front surface and the lower surface of the first lower battery cell stack 210L mean a surface in the x-axis direction and a surface in the −z-axis direction, respectively, of the first lower battery cell stack 210L. The rear surface and the lower surface of the second lower battery cell stack 220L mean a surface in the −x-axis direction and a surface in the −z-axis direction, respectively, of the second lower battery cell stack 220L.

The lower cover 700 and the lower frame 500 are joined at their corresponding edges, so that the lower battery cell stack 200L can be housed therein.

The upper cover 600 may include an upper recessed part 600D that is recessed downward between the first upper battery cell stack 210U and the second upper battery cell stack 220U. The first upper battery cell stack 210U and the second upper battery cell stack 220U may be spatially separated by the upper recessed part 600D.

The lower cover 700 may include a lower recessed part 700D that is recessed upward between the first lower battery cell stack 210L and the second lower battery cell stack 220L. The first lower battery cell stack 210L and the second lower battery cell stack 220L may be spatially separated by the lower recessed part 700D.

Referring to FIG. 5, the first upper battery cell stack 210U and the second upper battery cell stack 220U may include an electrode terminal ET and a module connector MT, respectively. The electrode terminal ET and the module connector MT may be mounted on a busbar frame located on one surface of each battery cell stack.

The electrode terminal ET may be electrically connected to any one of the electrode leads 111 and 112 (see FIG. 6) of the battery cell 110. The electrode terminal ET is exposed to the outside of the battery module 100, wherein the battery module 100 is connected to another battery module, BDU (battery disconnect unit) or the like via the electrode terminal ET, thereby being capable of realizing HV (High Voltage) connection. Here, the HV connection is a connection that serves as a power source for supplying power, and means a connection between battery cells or a connection between battery modules.

The module connector MT may be electrically connected to any one of the electrode leads 111 and 112 (see FIG. 6) of the battery cell 110. The module connector MT is exposed to the outside of the battery module 100, wherein the voltage information or temperature level of the battery cell 110 is transferred to the BMS (battery management system) via the module connector (MT), thereby being capable of realizing LV (low voltage) connection. Here, the LV connection means a sensing connection that senses and controls the voltage and temperature information of the battery cell.

Referring to FIGS. 1 and 5 together, each of the first upper battery cell stack 210U and the second upper battery cell stack 220U may include an electrode terminal ET and a module connector MT that are exposed toward the upper recessed part 600D of the upper cover 600. In other words, the upper cover 600 may be formed with an upper opening 600H through which the electrode terminal ET and the module connector MT of each of the first upper battery cell stack 210U and the second upper battery cell stack 220U can be exposed, wherein the upper opening 600H may be open toward the upper recessed part 600D.

Although specifically not shown in the figure, each of the first lower battery cell stack 210L and the second lower battery cell stack 220L may include an electrode terminal and a module connector that are exposed toward the lower recessed part 700D of the lower cover 700. In other words, the lower cover 700 may be formed with a lower opening 700H through which electrode terminals and module connectors of the first lower battery cell stack 210L and the second lower battery cell stack 220L can be exposed, wherein the lower opening 700H may be open toward the lower recessed part 700D.

At this time, a high voltage (HV) connection for connecting the electrode terminals ET and a low voltage (LV) connection for connecting the module connector MT are formed in each of the upper recessed part 600D and the lower recessed part 700D, which will be described with reference to FIG. 14.

FIG. 14 is a plan view of a battery pack according to an embodiment of the present disclosure.

Referring to FIG. 14 together with FIGS. 1, 5 and 12, the battery pack 1000 according to an embodiment of the present disclosure may include a plurality of battery modules 100. The plurality of battery modules 100 are arranged so that the side surfaces are in contact with each other, and can be housed in the pack frame 1100. The electrode terminals ET exposed through the upper openings 600H of the upper recessed part 600D may be connected to each other through a connection member to form an HV connection. Further, the module connectors MT exposed through the upper openings 600H of the upper recessed part 600D may be connected to each other through a connecting member to form an LV connection. As described above, it can eventually be connected to a BMS (battery management system). HV connection and LV connection can be made in the upper recessed part 600D of the upper battery cell stack 200U. Meanwhile, although not specifically shown in the figures, HV connection and LV connection between the lower battery cell stacks 200L may be made similarly to the above-described connections in the lower recessed part 700D.

That is, according to the present embodiment, an upper recessed part 600D is formed to spatially separate the first upper battery cell stack 210U and the second upper battery cell stack 220U, and HV connection and LV connection are made to the upper recessed part 600D. Similarly, a lower recessed part 700D is formed to spatially separate the first lower battery cell stack 210L and the second lower battery cell stack 220L, and HV connection and LV connection are made to the lower recessed part 700D. By providing a separate space for HV connection and LV connection, as in the upper recessed part 600D and the lower recessed part 700D, the form of the HV connection and the LV connection can be simplified, and space can be used efficiently.

Referring to FIGS. 2, 7, 8, 12, 13 and 14 together, a mounting hole MH for mount coupling may be formed in each of the upper recessed part 600D and the lower recessed part 700D. The mounting hole MH of the upper recessed part 600D and the mounting hole MH of the lower recessed part 700D may be located to correspond to each other.

Further, holes may be formed in the upper plate 411 of the upper frame 400 and the lower plate 511 of the lower frame 500 to correspond to the mounting holes MH of the upper recessed part 600D and the lower recessed part 700D.

The upper cover 600, the upper frame 400, the lower frame 500 and the lower cover 700 can be fixed to each other using the mounting hole MH of the upper recessed part 600D and the mounting hole MH of the lower recessed part 700D, and at the same time, the battery module 100 can be fixed to the pack frame 1100. The fixing method through the mounting hole MH is not particularly limited, and as an example, a bolt and nut coupling can be used. The upper recessed part 600D and the lower recessed part 700D according to the present embodiment can not only provide a space for HV connection and LV connection, but also perform the function of fixing the mounting of the battery module 100.

Next, the first upper protrusion part and the second upper protrusion part according to an embodiment of the present disclosure will be described in detail.

Referring to FIGS. 1, 10 to 13, the upper cover 600 according to the present embodiment may include a first upper protrusion part 610 located on first side and a second upper protrusion part 620 located on a second side opposite to the first side.

An inlet port 810 may be located in the first upper protrusion part 610, and an outlet port 820 may be located in the second upper protrusion part 620. As described above, the inlet port 810 for supplying the refrigerant to the cooling flow path P and the outlet port 820 for discharging the refrigerant from the cooling flow path P may be located opposite to each other. The refrigerant inflowed through the inlet port 810 may flow along the cooling flow path P in one direction and then be discharged through the outlet port 820.

The lower cover 700 according to the present embodiment may include a first lower protrusion part 710 located to correspond to the first upper protrusion part 610 and a second lower protrusion part 720 located to correspond to the second upper protrusion part 620.

A mounting hole MH for mount coupling may be formed in each of the first upper protrusion part 610 and the first lower protrusion part 710. The mounting hole MH of the first upper protrusion part 610 and the mounting hole MH of the first lower protrusion part 710 may be located to correspond to each other.

Further, a mounting hole for mount coupling may be formed in each of the second upper protrusion part 620 and the second lower protrusion part 720. The mounting hole MH of the second upper protrusion part 620 and the mounting hole MH of the second lower protrusion part 720 may be located to correspond to each other.

The first upper protrusion part 610 and the first lower protrusion part 710 may be coupled to each other through the mounting hole MH. In addition, the battery module 100 may be fixed to the pack frame 1100 through the mounting holes MH of the first upper protrusion part 610 and the first lower protrusion part 710. Similarly, the second upper protrusion part 620 and the second lower protrusion part 720 may be coupled to each other through the mounting hole MH. Also, the battery module 100 may be fixed to the pack frame 1100 through the mounting holes MH of the second upper protrusion part 620 and the second lower protrusion part 720.

Because the first upper protrusion part 610 provided with the inlet port 810 is mount-coupled to the first lower protrusion part 710, it is possible to reduce the possibility of leakage of the refrigerant through the gap between the first upper protrusion part 610 and the first lower protrusion part 710. That is, the pressing force of the mount coupling can be used as a sealing force to prevent leakage in the process of inflowing the refrigerant.

In addition, because the second upper protrusion part 620 provided with the outlet port 820 is mount-coupled to the second lower protrusion part 720, it is possible to reduce the possibility of leakage of the refrigerant through the gap between the second upper protrusion part 620 and the second lower protrusion part 720. That is, the pressing force of the mount coupling can be used as a sealing force to prevent leakage in the discharge process of the refrigerant.

The terms representing directions such as the front side, the rear side, the left side, the right side, the upper side, and the lower side have been used in embodiments of the present disclosure, but the terms used are provided simply for convenience of description and may change according to the position of an object, the position of an observer, or the like.

The one or more battery modules according to embodiments of the present disclosure described above can be mounted together with various control and protection systems such as a BMS (battery management system), a BDU (battery disconnect unit), and a cooling system to form a battery pack.

The battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

The invention claimed is:

1. A battery pack comprising:
an upper battery cell stack and a lower battery cell stack, wherein each of the upper battery cell stack and the lower battery cell stack comprises a plurality of battery cells;
an upper plate disposed on a lower surface of the upper battery cell stack;
a lower plate disposed on an upper surface of the lower battery cell stack, the upper plate and the lower plate forming a cooling flow path; and,
a lower cover that covers a lower surface of the lower battery cell stack,
an inlet port supplying a coolant to the cooling flow path; and
an outlet port discharging the coolant from the cooling flow path,
wherein the coolant flows from the inlet port to the outlet port in the cooling flow path, and
wherein the lower plate is in contact with the upper surface of the lower battery cell stack directly or via a thermal resin layer,
wherein the lower battery cell stack comprises a first lower battery cell stack and a second lower battery cell stack, and
wherein the first lower battery cell stack and the second lower battery cell stack are spatially separated by a mounting part disposed therebetween and protruding upward from the lower cover, and
wherein the mounting part is mounted to the lower plate.

2. The battery module according to claim 1, wherein:
the mounting part is a lower mounting part that protrudes upward between the first lower battery cell stack and the second lower battery cell stack.

3. The battery module according to claim 1, wherein:
the lower plate is in contact with both upper surfaces of the first and second lower battery cell stacks directly or via the thermal resin layer.

4. The battery pack according to claim 2, wherein:
the battery pack further comprises an upper cover that covers an upper surface of the upper battery cell stack,
the upper battery cell stack comprises a first upper battery cell stack and a second upper battery cell stack, and
the upper cover comprises an upper mounting part that protrudes downward from the upper cover and between the first upper battery cell stack and the second upper battery cell stack.

5. The battery pack according to claim 4, wherein:
each of the first upper battery cell stack and the second upper battery cell stack comprises an upper electrode terminal and an upper connector exposed toward the upper mounting part,
each of the first lower battery cell stack and the second lower battery cell stack comprises a lower electrode terminal and a lower connector exposed toward the lower mounting part, and
each of the upper mounting part and the lower mounting part comprises a high voltage connection for connecting the upper and lower electrode terminals and a low voltage connection for connecting the upper and lower connectors.

6. The battery pack according to claim 4, wherein:
the upper mounting part comprises an upper mounting hole for mount coupling,
the lower mounting part comprises a lower mounting hole for mount coupling, and
the upper and lower mounting holes are disposed to correspond to each other.

7. The battery pack according to claim 4, wherein:
the upper cover comprises a first upper protrusion part disposed at a first side of the upper cover and a second upper protrusion part disposed at a second side of the upper cover that is opposite to the first side of the upper cover,
the inlet port is disposed in the first upper protrusion part, and
the outlet port is disposed in the second upper protrusion part.

8. The battery pack according to claim 7, wherein:
the lower cover comprises a first lower protrusion part and a second lower protrusion part,
the first lower protrusion part is disposed to correspond to the first upper protrusion part, and
the second lower protrusion part is disposed to correspond to the second upper protrusion part.

9. The battery pack according to claim 8, wherein:
each of the first upper protrusion part and the first lower protrusion part comprises a first mounting hole, and
each of the second upper protrusion part and the second lower protrusion part comprises a second mounting hole.

10. The battery pack according to claim 1, wherein the cooling flow path includes a plurality of paths extended in a longitudinal direction which is perpendicular to a stacking direction of the lower battery cell stack and the upper battery cell stack and parallel to the cooling flow path.

11. The battery pack according to claim 1, wherein the inlet port and outlet port are disposed opposite sides of the battery pack.

12. The battery pack according to claim 11, wherein:
the coolant flows in a straight line along one direction of flow from the inlet port to the outlet port in the cooling flow path.

13. The battery pack according to claim 11, wherein:
the coolant flows in a curved line along the one direction of flow from the inlet port to the outlet port in the cooling flow path.

14. The battery pack according to claim 1, wherein:
the battery pack further comprises an upper frame and a lower frame,
the upper frame houses the upper battery cell stack and includes the upper plate comprising an upper recessed part, and
the lower frame houses the lower battery cell stack and includes the lower plate comprising a lower recessed part,
the upper plate is disposed on a lower surface of a bottom part of the upper frame,
the upper recessed part is recessed upward from the upper plate,
the lower plate is disposed on an upper surface of a top part of the lower frame,
the lower recessed part is recessed downward from the lower plate, and
the upper plate and the lower plate are joined such that the upper recessed part and the lower recessed part form the cooling flow path.

15. A battery pack comprising:
an upper battery cell stack and a lower battery cell stack, wherein each of the upper battery cell stack and the lower battery cell stack comprises a plurality of battery cells;
an upper plate disposed on a lower surface of the upper battery cell stack;
a lower plate disposed on an upper surface of the lower battery cell stack, the upper plate and the lower plate forming a cooling flow path; and
a lower cover that covers a lower surface of the lower battery cell stack,
wherein a coolant flows in the cooling flow path,
wherein the lower plate is in contact with the upper surface of the lower battery cell stack directly or via a thermal resin layer,
wherein the lower battery cell stack comprises a first lower battery cell stack and a second lower battery cell stack, and
wherein the first lower battery cell stack and the second lower battery cell stack are spatially separated from each other by a mounting part that protrudes from the lower cover.

* * * * *